United States Patent
Tatem

(10) Patent No.: US 10,021,437 B1
(45) Date of Patent: Jul. 10, 2018

(54) METHOD AND SYSTEM FOR DISCONTINUING A CHANNEL STREAM IN A MULTI-TERMINAL SYSTEM

(75) Inventor: Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 2177 days.

(21) Appl. No.: 12/210,850

(22) Filed: Sep. 15, 2008

(51) Int. Cl.
  H04N 7/18 (2006.01)
  H04N 21/2385 (2011.01)
  H04N 21/262 (2011.01)

(52) U.S. Cl.
  CPC ... *H04N 21/2385* (2013.01); *H04N 21/26216* (2013.01)

(58) Field of Classification Search
  CPC ............. H04N 21/442; H04N 21/4425; H04N 21/443; H04N 21/4438
  USPC ............................................... 725/75, 78, 82
  See application file for complete search history.

(56) References Cited

U.S. PATENT DOCUMENTS

| | | | |
|---|---|---|---|
| 5,058,138 A | 10/1991 | Figura et al. | |
| 5,742,680 A | 4/1998 | Wilson | |
| 5,970,386 A | 10/1999 | Williams | |
| 6,112,232 A | 8/2000 | Shahar et al. | |
| 6,622,307 B1 | 9/2003 | Ho | |
| 6,868,255 B1 | 3/2005 | Chanteau et al. | |
| 7,890,552 B2 | 2/2011 | Reichman | |
| 2002/0019984 A1 | 2/2002 | Rakib | |
| 2002/0026645 A1 | 2/2002 | Son et al. | |
| 2002/0046406 A1 | 4/2002 | Chelehmal et al. | |
| 2002/0116707 A1 | 8/2002 | Morris et al. | |
| 2003/0053562 A1 | 3/2003 | Busson et al. | |
| 2003/0192053 A1 | 10/2003 | Sheppard et al. | |
| 2004/0006772 A1 | 1/2004 | Ansari et al. | |
| 2004/0163125 A1 | 8/2004 | Phillips et al. | |
| 2004/0172658 A1* | 9/2004 | Rakib et al. | 725/120 |
| 2004/0250273 A1 | 12/2004 | Swix et al. | |
| 2004/0252243 A1 | 12/2004 | Stewart | |
| 2005/0157215 A1* | 7/2005 | Minnick et al. | 348/725 |

(Continued)

FOREIGN PATENT DOCUMENTS

| | | |
|---|---|---|
| WO | 2004054157 A2 | 6/2004 |
| WO | 2007050081 | 5/2007 |

OTHER PUBLICATIONS

Anonymous; "ANGA Sees European Launch of RGB Networks USM—The Cable Industry's Highest Density QAM Modulator"; IPTV Industry; May 22, 2007; XP002524087; Retrieved from the Internet: URL:http://www.iptv-industry.com/pr/6d.htm; the whole document.

(Continued)

*Primary Examiner* — Junior Mendoza

(74) *Attorney, Agent, or Firm* — Harness, Dickey & Pierce, PLC

(57) ABSTRACT

A method and system for suspending channel signals includes a network, a plurality of terminals in communication with the network and a receiving unit in communication with the plurality of terminals through the network. The receiving unit receives a channel signal and communicates the channel signal to the plurality of terminals through the network. The receiving unit monitors inactivity at the plurality of user terminals. The receiving unit discontinues distributing the channel signal when channel inactivity is determined by monitoring the plurality of user terminals.

10 Claims, 6 Drawing Sheets

(56) References Cited

U.S. PATENT DOCUMENTS

| | | | |
|---|---|---|---|
| 2005/0216937 A1 | 9/2005 | Shintani et al. | |
| 2006/0041925 A1 | 2/2006 | Suh | |
| 2006/0126551 A1 | 6/2006 | Delaunay et al. | |
| 2006/0271954 A1 | 11/2006 | Lankford et al. | |
| 2007/0033621 A1* | 2/2007 | Roeck | 725/80 |
| 2007/0044119 A1* | 2/2007 | Sullivan | H04H 60/32 725/9 |
| 2007/0101398 A1 | 5/2007 | Islam | |
| 2007/0107019 A1 | 5/2007 | Romano et al. | |
| 2007/0115933 A1 | 5/2007 | Muhamed et al. | |
| 2007/0162928 A1 | 7/2007 | Mickle et al. | |
| 2007/0164609 A1* | 7/2007 | Shalam et al. | 307/10.1 |
| 2007/0220577 A1* | 9/2007 | Kongalath | 725/131 |
| 2007/0266414 A1 | 11/2007 | Kahn et al. | |
| 2008/0022322 A1 | 1/2008 | Grannan et al. | |
| 2008/0107133 A1* | 5/2008 | Lee | 370/477 |
| 2008/0109854 A1 | 5/2008 | Reinoso | |
| 2008/0127277 A1 | 5/2008 | Kuschak | |
| 2008/0301748 A1* | 12/2008 | Lida et al. | 725/121 |
| 2009/0064252 A1* | 3/2009 | Howarter | H04N 21/2385 725/114 |
| 2009/0070442 A1* | 3/2009 | Kacin | H04L 63/029 709/221 |
| 2009/0141735 A1* | 6/2009 | Kolhi | 370/432 |
| 2009/0278992 A1 | 11/2009 | Gutknecht et al. | |
| 2009/0320055 A1* | 12/2009 | Langille et al. | 725/14 |
| 2009/0320058 A1 | 12/2009 | Wehmeyer et al. | |

OTHER PUBLICATIONS

Anonymous; "Continuum DVP Dense QAM Array for Video-on-Demand Delivery"; Scientific Atlanta; Jun. 30, 2002; XP002524543; Retrieved from the Internet: URL:http://www.scientificatlanta.com/customers/source/7000183.pdf; the whole document.

Final Rejection dated Sep. 15, 2011 in U.S. Appl. No. 12/210,867, filed Sep. 15, 2008 by Richard B. Tatem.

Non-final Office action dated Apr. 1, 2011 in U.S. Appl. No. 12/210,867, filed Sep. 15, 2008 by Richard B. Tatem.

Anonymous; "Motorola SmartStream Encryptor Modulator"; Jul. 1, 2003; XP55008043; retrieved from the Internet: URL:http://broadband.motorola.com/catalog/product_documents/SEM_wp_july03.pdf [retrieved on Sep. 26, 2011].

European Telecommunications Standards Institute (ETSI); "HFC (Cable Tv) Access Networks; Part 1: Interworking the PSTN, N-ISDN, Internet and Leased lines Networks [Network aspects]"; ETSI Draft; TD05M; 650 Route Des Lucioles, F-06921 Sophia-Antipolis, France; No. V1.1.1; Oct. 9, 1998; pp. 1-41; XP014057863; [retrieved on Oct. 9, 1998].

Non-final Office action dated Dec. 4, 2013 in U.S. Appl. No. 12/210,867, filed Sep. 15, 2008 by Richard B. Tatem.

Non-final Office action dated Jun. 7, 2012 in U.S. Appl. No. 12/210,867, filed Sep. 15, 2008 by Richard B. Tatem.

Final Rejection dated Nov. 20, 2012 in U.S. Appl. No. 12/210,867, filed Sep. 15, 2008 by Richard B. Tatem.

* cited by examiner

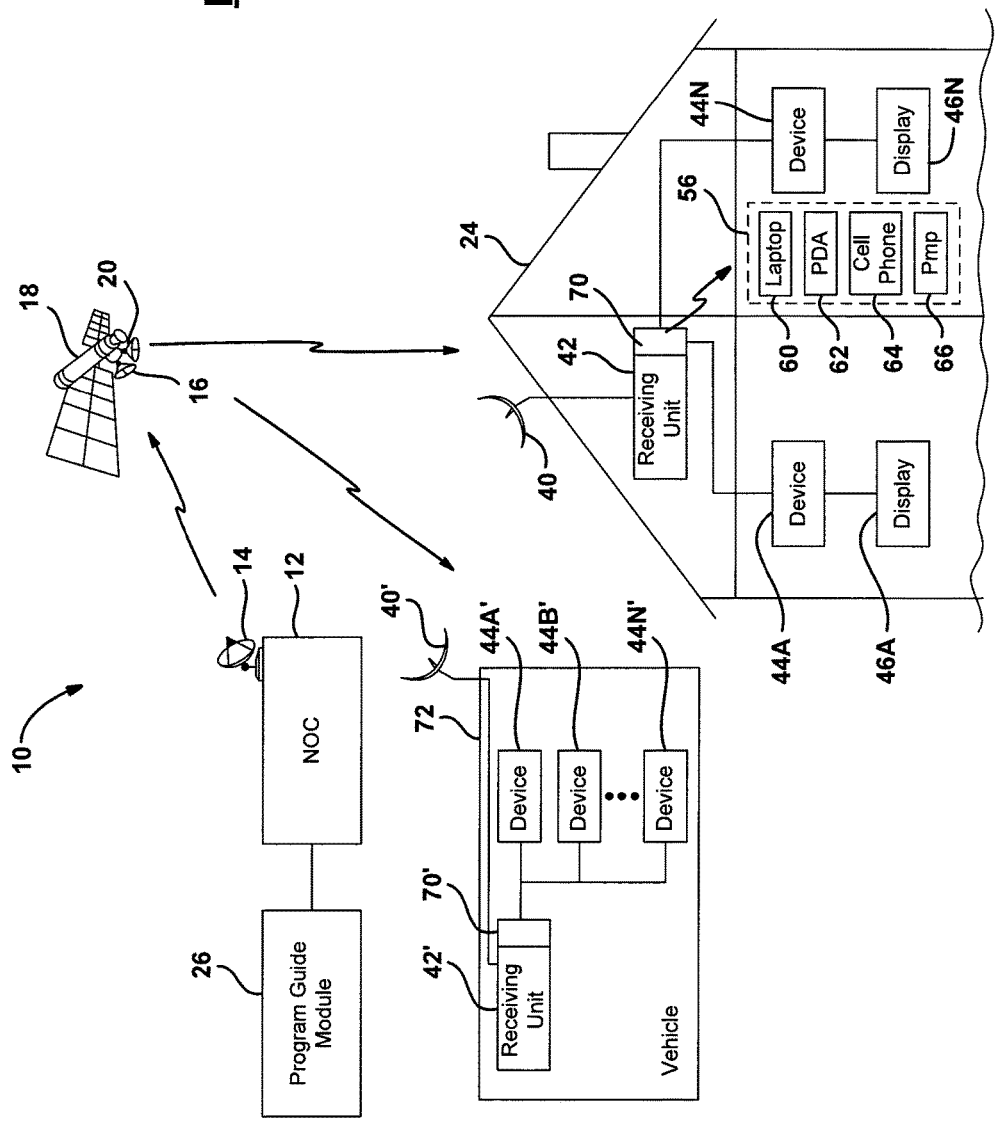

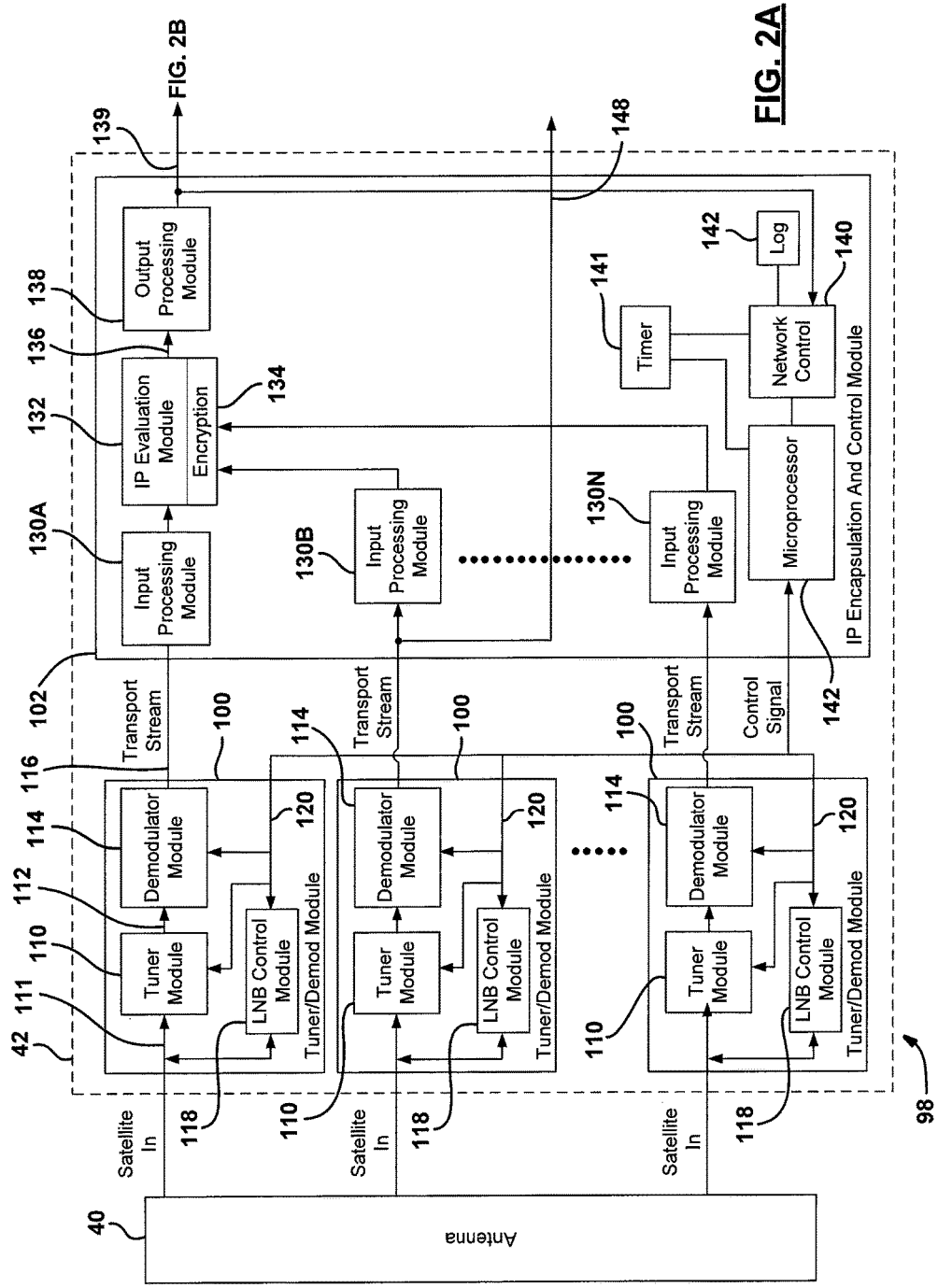

METHOD AND SYSTEM FOR DISCONTINUING A CHANNEL STREAM IN A MULTI-TERMINAL SYSTEM

TECHNICAL FIELD

The present disclosure relates generally to satellite television systems and, more particularly, to a satellite television system acting as a local head end to distribute various channels throughout a multi-terminal system or network.

BACKGROUND

Satellite television has become increasingly popular due to its wide variety of programming. Typical satellite receivers are designed as one integrated unit. That is, the various tuning functions, conditional access functions and processing are all performed on the same circuit board.

For certain types of applications, an IP encapsulated bitstream is desirable. The IP bitstream is distributed to various monitors for playback. The IP solutions are typically targeted at large installations to support hundreds of simultaneous users. Such systems are typically not economical for low-end installation requiring only a modest number of receivers. Such applications include low-end commercial applications such as bars, waiting rooms and single-family homes. A set top box capable of converting the IP stream to usable signals is typically used. Providing some basic service to applications such as multiple dwelling units is desirable.

Hotels and other applications may also use a satellite master antenna television (SMATV) system. Certain systems, such as hotels, may use existing wiring to distribute the channel signals. As in most networks, bandwidth is a limited resource. In a large system, many channels may not be used by particular users. As technology progresses, more and more bandwidth is required for higher resolution video. Bandwidth consumed with unused video channels may be put to better use.

SUMMARY OF THE DISCLOSURE

The present disclosure allows the suspension or discontinuation of channels in the network that are no longer being viewed by users. By discontinuing a channel from being distributed throughout a network, the limited bandwidth is conserved.

In one aspect of the disclosure, a system for suspending channel signals includes a network, a plurality of terminals in communication with the network and a receiving unit in communication with the plurality of terminals through the network. The receiving unit receives a channel signal and communicates the channel signal to the plurality of terminals through the network. The receiving unit monitors inactivity at the plurality of user terminals. The receiving unit discontinues distributing the channel signal when channel inactivity is determined by monitoring the plurality of user terminals.

In another aspect of the disclosure, a method includes distributing a channel through a network, monitoring channel usage and discontinuing distributing the channel when no channel usage is determined by monitoring.

In a further aspect of the disclosure, a method includes distributing a channel signal through a network from a receiving device to a user device, placing the user device in a standby mode, communicating a standby signal to a receiving unit and discontinuing distributing the channel signal after communicating the standby signal.

Other features of the present disclosure will become apparent when viewed in light of the detailed description of the preferred embodiment when taken in conjunction with the attached drawings and appended claims.

BRIEF DESCRIPTION OF THE DRAWINGS

FIG. 1 is a system level view of a satellite broadcasting system according to the present disclosure.

FIGS. 2A and 2B form a detailed block diagrammatic view of a receiving unit and associated distribution system.

DETAILED DESCRIPTION

Figure 2B:
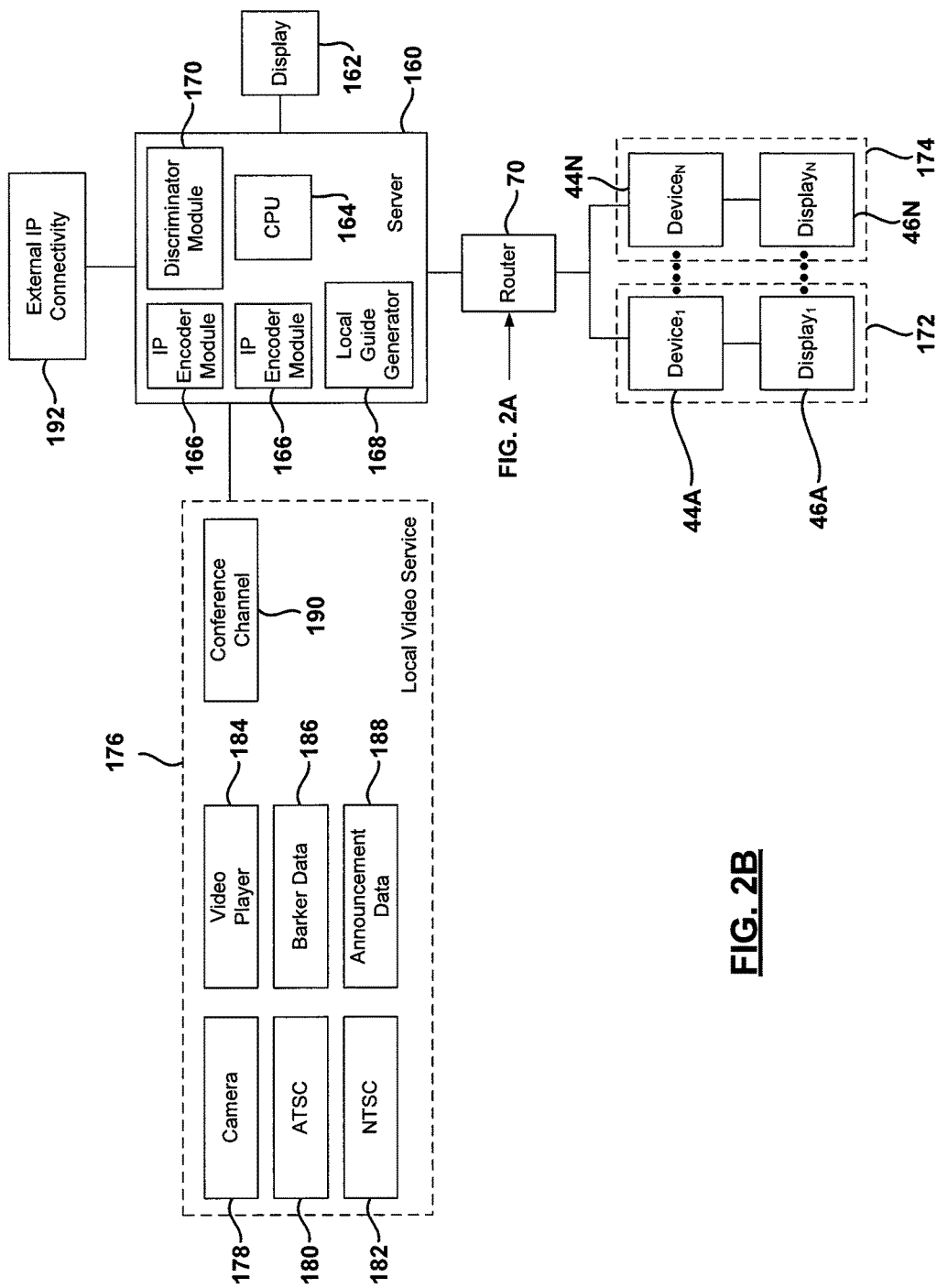

In the following figures the same reference numerals will be used for the same views. The following figures are described with respect to a satellite television system. However, those skilled in the art will recognize that the teachings of the present disclosure may be applied to various types of systems including a cable system.

As used herein, the term module refers to an Application Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase or at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes a network operations center 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a home 22 as well as multiple dwelling units and commercial buildings 24. The wireless signals may have various types of information associated with them including various channel information such as a channel or program guide, metadata, location information and the like. The wireless signals may also have various video and audio signal information associated therewith. The wireless signals may also include program guide data from a program guide module 27. The program guide module 27 may communicate various objects to the network operation center 12 so that a grid guide may be displayed on a display associated with a receiving device. Various types of data may be communicated about the programming and grid guide including the channel number, a network identifier, program data such as a start and end time of airing, title, numerical identifier, content data such as actors, descriptions, ratings and the like. Grid guide data may include the relative positions of the data, the line structures and the like.

Building 24 includes a receiving antenna 40 that receives the wireless signals from the satellite 18 and processes the signals in a receiving unit 42. An IP encapsulated bitstream may be generated at the receiving unit 42 to provide signals in a second format. A plurality of devices 44A-44N in communication with the receiving unit 42 receives the IP encapsulated bitstream and controls a display 46A-46N in response to the bitstream. The displays 46A-46N may include either an audio or a video display, or both.

As was mentioned above, the system may also apply to a cable or wired system. In such a case, the antenna 40 would be replaced with a cable connection. The system may also be used in a terrestrial broadcast system. In such a case, the satellite antenna 18 would be replaced by a terrestrial signal receiving antenna.

The present disclosure may also be used for displaying various wireless information on a personal mobile device 56, such as a laptop computer 60, a personal digital assistant 62, a cellular telephone 64 or a portable media device 66. It should be noted that the personal mobile devices 56 may receive wireless signals having various types of information from a router 70 that is in communication with the receiving device 42. The router 70 may be wireless.

The router 70 may also be a wired router for distributing signals to the plurality of devices 44A-44N. The router 70 may be an independent unit or incorporated into the receiving unit 42. An IP switch or router 70 may also be an optional feature depending on the system. The router, server, receiving unit and the plurality of terminals may form a network. In this example, an IP network is formed.

The local content distribution system or multi-terminal system may also be disposed within a vehicle 72. The system may also include an antenna 40', receiving unit 42' and a plurality of terminals 44A', 443 . . . 44N'. The vehicle may be different types of vehicles including an airplane, ship, train, bus, van or automobile.

Referring now to FIGS. 2A and 2B, the present disclosure is applicable to a multi-terminal system 98 that includes a number of devices and a number of displays. Such a system may be suitable for multiple dwelling units, commercial buildings such as a bar, vehicles or large single-family homes. In this example, one or more antennas 40 may be coupled to a plurality of tuner demodulator modules 100 within the receiving unit 42. Antenna 40 may be various types of antennas. The antenna 40 may be a single antenna used for satellite television reception, or a number of antennas. The antenna 40 may also be an electronic or moving antenna. An electronic antenna or moving antenna may be particularly useful in a vehicle.

The receiving unit 42 of the system 98 is illustrated in further detail. The receiving unit 42 may be formed to be modular. The receiving unit 42 may include a plurality of tuner demodulator modules 100 formed on a first circuit board and an IP encapsulation and control module 102 formed on a second circuit board. The modules within the receiving unit may be arranged physically in any number of ways. The circuit boards may contain the components of their respective module. The circuit boards may be spaced apart and a connector, bus or communication link may be used to interconnect the two modules.

The tuner demodulator module 100 includes a tuner 110 that receives the signal or the satellite signal 111 for the selected channel and generates a tuner signal 112. The tuner signal 112 is provided to a demodulator module 114 that demodulates the tuner signal 112 to form a demodulated signal or transport stream 116.

A low noise block (LNB) control module 118 is in communication with the tuner module 110 and the demodulator module 114. The LNB control module 118 may control the tuner and demodulator functions according to received control signals 120. For example, the LNB control module 118 may switch the LNB contained in the antenna 40 to receive the proper signals requested by the IP encapsulation and control module 102. Further, guide data or conditional access data and other information may be requested from the IP encapsulation and control module and provided for in the low noise block control module 118. The LNB control module 118 may be used for powering the outdoor unit (the antenna 26) and selecting the particular orbital location if needed.

Each IP encapsulation and control module 102 includes a plurality of input processing modules collectively referred to with reference numeral 130. Each tuner demodulator module 100 may include a respective input processing module 130A through 130N. The input processing module 130 may act as a buffer for buffering the transport stream signal 116. The input processing module 130 also acts as a filter passing only those packets needed by downstream devices 30 or 44 and discarding the packets that are not needed by downstream devices.

An IP encapsulation module 132 receives the transport stream and repackages it using an Internet protocol (IP) to form an IP encapsulated signal 136. A single IP encapsulation module or multiple IP encapsulation modules 132 may be provided. Additional network control messages may also be inserted by the IP encapsulation module 132. The IF encapsulation module 132 may provide various information in the form of a packet header. The packet header may include information such as the destination IP address, the source IP address, the type of protocol, various flags, check sums, metadata such as channel information, ratings, and the like. The destination address may be one address or group of addresses. Various types of transport packets may be formed depending on the desired characteristics of the system. TCP, UDP, DCCP, SCTP and the like may be used. An encryption module 134 may encrypt the encapsulated signal 136.

The IP encapsulated signal 136 is communicated on output processing module 138. The encryption module 134 is an optional module that may be separate from the IP encapsulation module 132 or included therein. The output processing module 138 may also act as a buffer for buffering output to the device 30. The output of 138 is IP stream 139.

A network control module 140 is used to monitor the IP network and accept commands from downstream equipment requesting channel changes, guide data, conditional access data and the like. The network control module 140 manages the aspects of the IP data sent to and from the system into the IP network. The network control module 142 may monitor a time of the last channel change or time since the last channel change of each user device using the timer 141. The signals received from each user device may be in various formats including Real Time Protocol (RTP). Monitoring features may be enabled or disabled. Of course, the timer 141 may be incorporated in various components of the system including the network control module 140, a microprocessor 143 or other component.

A log 142 which is formed of memory may be created by the network control module to log the specific channels each receiver was tuned to. The log 142 may help in network allocation and planning for usage patterns for sizing IP video networks to accommodate video viewing. The log 142 may also store which user devices are in an active state.

A microprocessor 143 is in communication with the input processing module 130, the IP encapsulation module 132, the output processing module 138, and the network control module 140. The microprocessor 143 also generates control signals to the LNB control module 118 of the tuner demodulator module 100. The microprocessor 143 may also be in direct communication with the tuner module 110 and the demodulator module 114. The control protocol may include I²C industry standard or various other types of industry standards or custom standards suitable for this application.

The transport streams may correspond to one or more particular channel. The number of tuner demodulator modules 100 depends upon various system parameters. For example, if each device 44A-44N may be tuned to a different channel, then a separate tuner demodulator module 100' may be provided for each respective device 44 up to and including the total number of unique transponders (satellite system) or RF frequencies (cable, terrestrial) used by the system. If less than each of the devices may be used at any one particular time, the number of tuner demodulator modules 100 may be accordingly reduced. Likewise, in a sports bar setting, only a few different channels may be required. Therefore, a small number of tuner demodulator modules 100 may be provided.

One advantage to the system set forth in FIGS. 2A and 2B is that identical tuner demodulator modules 100 may be provided. These modules may, thus, be mass produced and because of the economies of scale, the cost is reduced. Also, standard configurations of the IP encapsulation and control module 102 may also be formed. The example shown in FIG. 2 includes one set of circuitry used to drive one device 44. Of course, multiple devices using the same channel may be operated using the IP encapsulation and control module 102. The IP encapsulation and control module 102 illustrated in FIG. 2 may be mass produced in standardized format. Each of the variances may be mass produced and, thus, the overall cost of the system is reduced, decreasing the number of customer configurations. The circuitry of the IP encapsulation and control module 102 is essentially repeated with additional input processing buffers 130A through 130N.

A router 70 is included in the system. The router 70 may be a hard-wired router or a wireless router. The wireless router forms a wireless local area network (WLAN). The wireless local area network may be coupled to various devices including the wireless devices 56 represented by reference numbers 60-66 in FIG. 1.

The transport stream 148 from the tuner demodulator module 100 may also be provided. This may be passed through the IP encapsulation and control module or provided directly from the tuner demodulator module 100.

The router 70 may also be in communication with a local server 160. The local server 160 may be a server having a display 162 associated therewith. The local server 160 may serve many purposes, including processing various data in a CPU 164, encoding through encoder modules 166 local video sources as will be described below. The server may also include a local guide generator 168 used to insert local channels within the program guide as will be further described below. A discriminator module 170 may also be included within the server 160. The discriminator module 170 may be used to provide capability to discriminate receiving sources of various content. For example, a first group 172 of devices may be established for receiving various information whereas a second group 174 of devices 44 may be provided to not receive information. Examples of uses of the discriminator module 170 may be for hotels to provide conference materials to various conference attendees, while preventing others not attending the conference from receiving the content. Services such as services provided to a concierge floor or an executive suite may be different than those offered to general guests.

The encoder module 166 may use various types of encoder modules that include MPEG2 encoders, MPEG4 encoders, AVI or H.264 type encoders. The encoders are in communication with a local video source 176. The local video source 176 may include one source or multiple sources. One example of a local video source 176 is a camera 178. The camera 178 may be directed to various places such as a front door security camera, a fitness center camera or a camera at a particular event. The local video source may also include an ATSC video source 180 or an NTSC source 182. These sources may be received over the air and provide local information throughout the communication system. The ATSC video source and NTSC source may generate signals on-site. A video player 184 may also act as a local video source 176. The video player 184 may be a digital video player, a digital video recorder, a tape player, or the like. An example of a suitable use for a video player 184 would be to provide a hotel guest with local attraction highlights.

The local video source 186 may also include barker data 186. Barker channels may be established for providing information regarding special events or the like in a bulletin board-type format. The barker channel may have various screen shots with or without audio to provide the devices within the distribution system with various information. For example, conference times, local menus or various other types of announcements may be provided within the barker data.

Announcement data 188 may also be separately provided within the local video source 176. The local video source announcement data 188 may provide various types of announcements throughout the system. These may include emergency alerts or the like.

A conference channel 190 may also be separately provided within the local video source 176. The conference channel 190 may include a channel dedicated to various conference attendees.

Although the local video source 176 is illustrated as a separate device, the various functionality may also be incorporated into the server 160. Because the server 160 may also act as a computer, announcement data and other types of data may be controlled and inserted to form various screens. A graphical user interface or the like may be provided to allow the operator of the server to easily insert information to be provided on various channels for guests or residents.

The server 160 may also be used to retrieve information with external IP connectivity 192. By providing IP connectivity, the Internet may be accessed by the server 160. The Internet may also be used to provide control of the server 160 from a remote location. Monitoring of the server 160 may also be provided from a remote location. As mentioned above, the server 160 may be used to create various numbers of channels that are located at various locations within a program guide. The discriminating module 170 is used to provide targeted information in a system as well. For example, one particular terminator device 44 of the plurality of devices or terminals may be targeted for a particular message such as "Rent is Due" or an emergency announcement. By allowing one device to receive the information and excluding others from receiving the information, such a targeted message may be provided. The targeted message may be provided based upon a MAC address or a receiver identifier.

Figure 3:
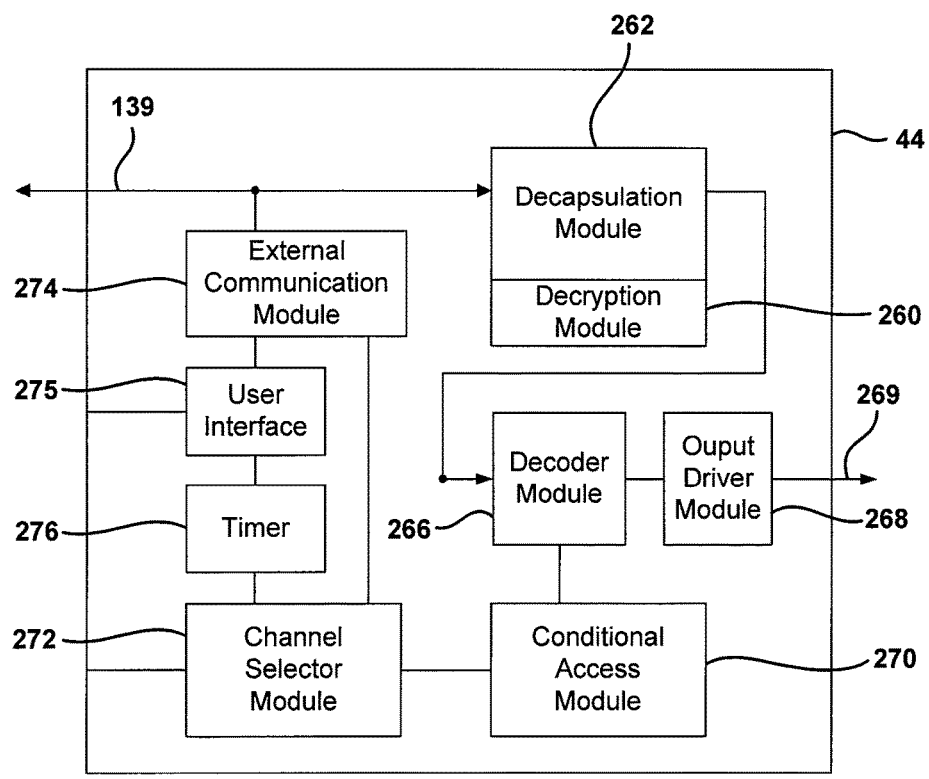
FIG. 3 is a block diagrammatic view of a device.

Referring now to FIG. 3, a local terminal or user device 44 is illustrated in further detail. The user device 44 may be referred to as a set top box. Device 44 may include a decryption module 260 if encryption is performed in the receiving unit 42. Decryption module 260 may not be included in a device 44 should the receiving device not include encryption. Each device 44 may have an address such as a MAC address for receiving addressed packets.

A decapsulation module 262 may be used to decapsulate the various IP packets in the IP encapsulated signal 139 from the receiving unit. The output of decapsulation module 262 is a transport stream containing audio/video data, guide information, conditional access information, etc. A decoder module 266, such as an MPEG decoder, receives the transport signal from the decapsulation module 262 and decodes the signal. The decoded signal is provided to an output driver module 268. The output driver module 268 generates various audio and video signals 269 for the display 32 illustrated in FIGS. 1 and 2. A conditional access module 270 may be included in the receiving device 44. Conditional access module 270 may take the form of a conditional access card or other security device. Without a conditional access module 270, the system may not function. Under certain conditions, the conditional access module 270 may be completely removed from the system or moved to the tuner demodulator module 100 or the IP encapsulation and control module 102.

A channel selector module 272 may also be included within the device 44. The channel selector module 272 may generate a channel control signal to communicate the channel desired at the particular device. The channel control signal may be provided to the receiving unit. More specifically, the channel control signal may be provided to the network control module 140 or microprocessor 143 module through an external communication module 274. The input to the channel selector may come from a remote control, push button or other user interface 275.

The external communication module 274 may generate formatted signals for communication to the receiving unit of FIG. 2 through the network. Various formats such as RTP may be used. The information communicated may be channel change requests or activity signals that communicate that the user device is being used. The activity signals may be derived from the inputs such as front-panel buttons being pushed or the remote control being used. The particular activity may not be communicated, just presence of an activity.

The timer 276 may be used for timing various events or timing a time since an event. One example is that the timer 276 may time the time since an input to the user device such as front-panel button pushing or remote control use. When the time is large enough the user device may be placed in a stand-by mode and an inactivity signal may be communicated to the receiving unit. A request for discontinuing or suspending a channel stream may also be formed. The disconnection of a user device from the channel signal may initiate a screen saver to be displayed on a display associated with the user device if the display is still on or activated. The screen display or screen saver may correspond to a warning such as "You have been disconnected from the channel due to inactivity. Press any button on the remote or set top box to continue."

Figure 4:
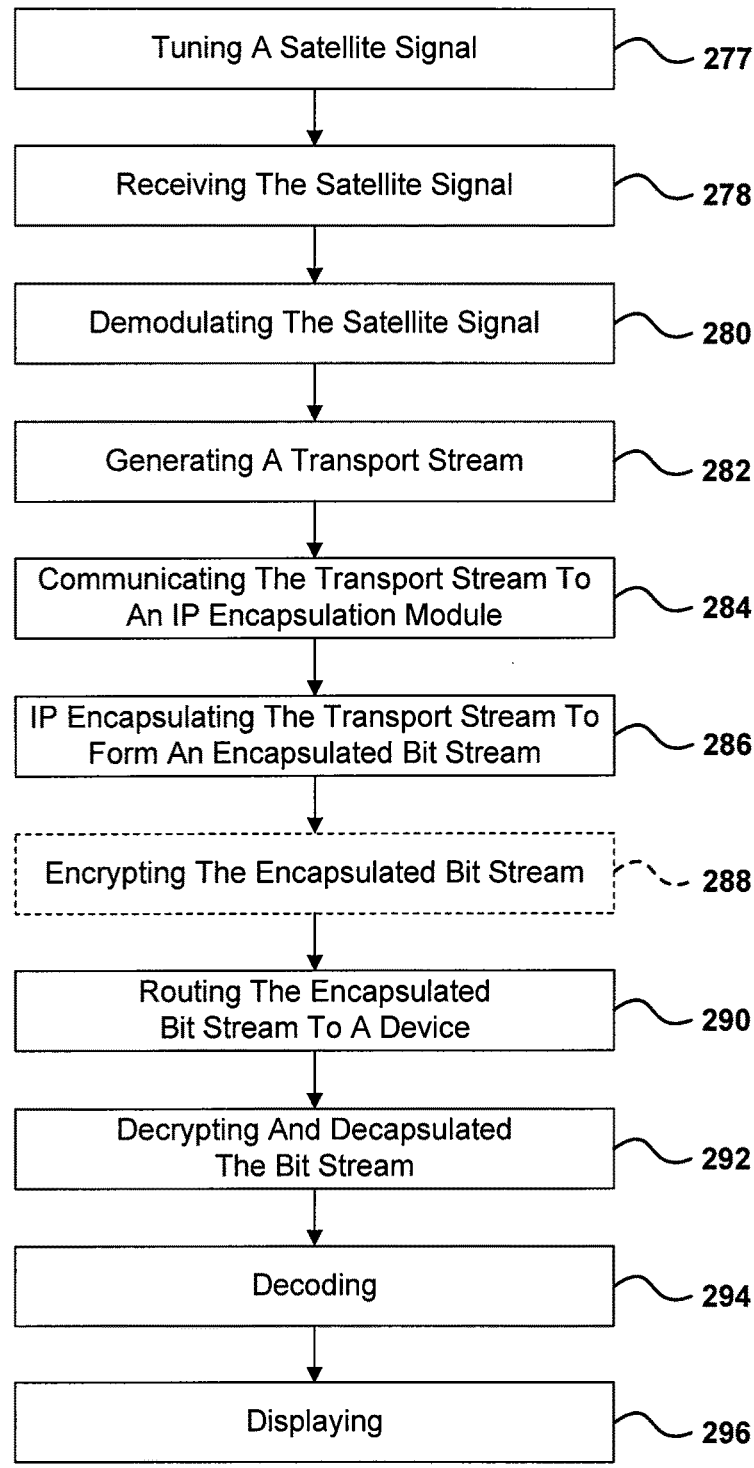
FIG. 4 is a flowchart of a method of receiving a signal according to one aspect of the disclosure.

Referring now to FIG. 4, a satellite signal is tuned in a tuner in step 277. As mentioned above, the signal may be a satellite signal or may also be some other terrestrial signal or cable television signal. In the following example, the satellite signal, rather than a cable or terrestrial signal, will be used. In step 278, the satellite signal is received. In step 280, the satellite signal is demodulated. A transport stream is generated in step 280. In step 284, the transport stream is communicated to the IP encapsulation module 132 of FIGS. 2 and 4. The IP encapsulation module 132 may be separated from the tuner demodulator module 100. In step 286, the transport stream is IP encapsulated to form an encapsulated bitstream.

If encryption is used in the system, step 288 encrypts the encapsulated bitstream. In step 290, the encapsulated bitstream is routed to a device. In step 292, if encrypting is used, the bitstream is decrypted. In step 292, the bitstream is also decapsulized.

In step 294, the bitstream is decoded. In step 296, the signal is displayed. The display may be an audio display or visual display.

It should be noted that some of the modules used in the above, such as the routers, IP encapsulating modules and the like, may also include some IP processing. The present examples provide additional processing to such devices.

Figure 5:
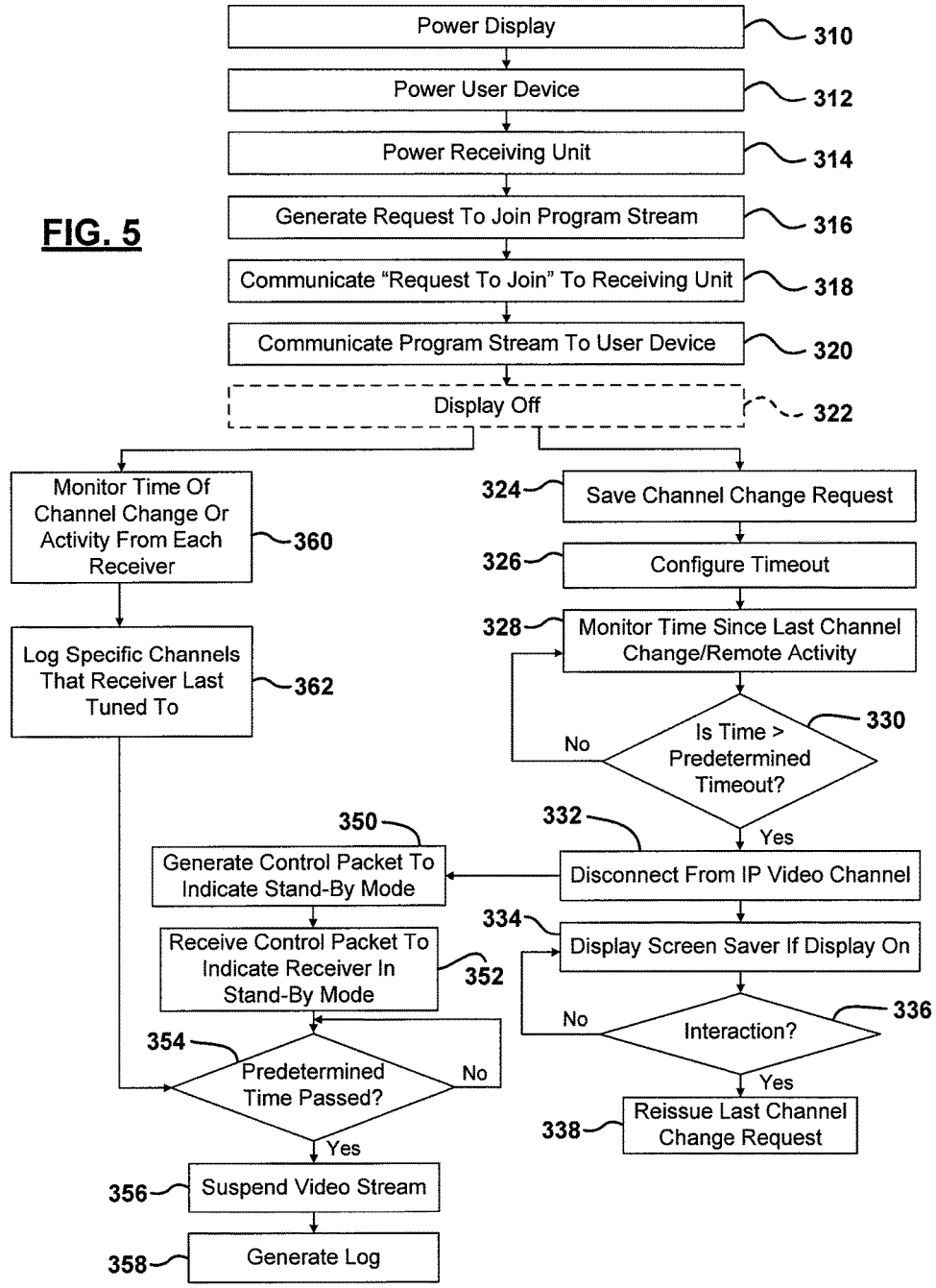
FIG. 5 is a flowchart of a method for discontinuing a channel stream in a network.

Referring now to FIG. 5, a method for suspending video streams from the receiving unit is set forth. The method may include the suspension of the video stream through interaction with the user device or independently through monitoring by the receiving unit. The method monitors one or many user devices or video streams to determine if they are being used. The user may be inferred by inactivity at the user device. When not in use by anyone of the users or user devices within the system, then the stream may be suspended. In step 310, a display associated with the receiving device is powered. In step 312, a user device is powered. The order of steps 310 and 312 may be changed. In addition, the receiving unit may be powered in step 314. In step 316, a request to join a program stream is generated by the user device in step 312. The request to join a program stream may be communicated in a predetermined format from the user device to the receiving unit. The request to join is communicated to the receiving unit using a predetermined format, such as an RTP format. The request to join may include a request to join a particular channel number. The request to join may be provided from interaction with a user interface or buttons on the user device.

In step 320, the program streams communicate to the user device through the network. The program stream will continue to be communicated until another event is used to suspend the program stream. In step 322, the display associated with the user device may be turned off. This is an optional step. After step 322, two courses of action may take place. As mentioned above, the user device may communicate with a receiving unit to suspend a program stream. Also, the receiving unit may also monitor the streaming signals and the user's devices and suspend a program stream. In step 324, a channel change request may be saved at the user device. The channel change request may store the last channel change so that the channel may be returned quickly when desired. In step 326, a time-out may be configured at the user device. The user device may have the time-out configured at various times, including upon power outage or upon initially configuring the user device. The time-out may be a time of no activity after which the program stream may be suspended. In step 328, a time since the last channel change or remote activity may be monitored. The activity may also be activity at the front panel or of a user interface of the user device. In step 330, if the time since the last activity is not greater than the predetermined time-out, step 328 may again be performed. In step 330, if the time is greater than a predetermined time-out, the user device may be disconnected from the IP video channel in step 332. A screen display or screensaver may be displayed upon disconnection from the channel in step 334. In step 336, if no interaction takes place with the user device, the screen display continues to be displayed in step 334. In step 336, if there is interaction with the screen display, step 338 is performed. In step 338, a last channel change request may be reissued. A last channel change request may be communicated to the receiving unit so that the user device may be again connected to the previous channel.

Referring back to step 332, to disconnect from the IP video channel, step 350 may be performed. In step 350, a control packet to indicate a standby mode may be communicated from the user device to the receiving unit through the network. In step 352, the receiving unit receives the control packet to indicate the receiver is in standby mode. In step 354, a time period since the standby mode may be determined. In step 354, if a predetermined time period has not passed, step 354 may be repeated. In step 354, if a predetermined time period has passed, step 356 may be performed, which suspends the video stream in step 356 and generates a log of the suspended stream in step 338 and the channel from which it is suspended in step 358. Suspending the video stream in step 356 allows the unused bandwidth to be used by other channels or for other communications within the system. Suspending the channel may be performed after a predetermined time period has passed since step 354. The channel may be suspended when no user devices are actively using the user device. Step 354 may be an optional step and suspension of the channel may take place when no other user device is receiving the channel.

As mentioned above, the receiving unit may also act to suspend the channel signal. After steps 320 and 322, step 360 may be performed. In step 360, a time of channel change or activity from each receiver is monitored. In step 362, a log may be generated for the specific channels to which each receiver was last tuned. After step 362, steps 354-358 may be performed. In step 354, a time since the last activity or channel change may be determined; and if a predetermined time has passed, the video stream may be suspended and a log may be generated in steps 356 and 358, respectively, as described above.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
   distributing a first television channel signal from a receiving unit through a network to a first user device of a plurality of user devices and a second television channel signal to a second user device of the plurality of user devices through the network;
   generating or receiving a first push button signal at the first user device, said first push button signal corresponding to a first signal from pushing a first button of a first front panel of the first user device or pushing a first button of a first remote control device associated with the first user device;
   generating or receiving a second push button signal at the second user device, said second push button signal corresponding to a second signal from pushing a second button of a second front panel of the second user device or pushing a second button of a second remote control device associated with the second user device;
   communicating a first push button signal from the first user device to the receiving unit through the network;
   communicating a second push button signal from the second user device to the receiving unit through the network;
   monitoring a first time since receiving the first push button signal at the receiving unit;
   monitoring a second time since receiving the second push button signal at the receiving unit;
   discontinuing distributing the first television channel to the first user device from the receiving unit when the first time is greater than a predetermined time; and
   discontinuing distributing the second television channel to the second user device from the receiving unit when the second time is greater than a predetermined time, wherein discontinuing distributing the second television signal is independent from distributing the first television signal.

2. The method as recited in claim 1 further comprising receiving the first television channel signal and the second television channel signal from a satellite at the receiving unit prior to distributing.

3. The method as recited in claim 1 wherein communicating comprises communicating the first push button signal from a personal mobile device.

4. A method comprising:
   distributing a first television channel signal using a first stream through a network from a receiving unit to a first user device of a plurality of user devices;
   distributing a second television channel signal using a second stream through the network from a receiving unit to a second user device of a plurality of user devices;
   placing the first user device in a first standby mode;
   placing the second user device in a second standby mode;
   communicating, through the network, a first standby signal comprising a first control packet from the first user device to the receiving unit;
   communicating, through the network, a second standby signal comprising a second control packet from the second user device to the receiving unit;
   monitoring a first time since receiving the first standby signal at the receiving unit;
   monitoring a second time since receiving the second standby signal at the receiving unit;
   discontinuing the first stream for distributing the first television channel signal through the network to the first user device when the first time is greater than a predetermined time;
   discontinuing the second stream for distributing the second television channel signal through the network to the second user device when the second time is greater than a predetermined time; and
   generating a log at the receiving unit comprising an indicator of the television channel signal that was discontinued from the first user device and the second user device.

5. The method as recited in claim 4 further comprising, prior to placing the first user device in the standby mode, monitoring user inactivity at the user device.

6. A system for distributing a first television channel and a second television channel comprising:
   a network;
   a plurality of user terminals in communication with the network;
   a receiving unit in communication with the plurality of user terminals through the network receiving the first television channel signal and a second television channel and communicating the first television channel signal and the second television channel signal to the plurality of user terminals through the network;

a first user terminal of the plurality of user terminals receives or generates a first push button signal and communicates the first push button signal to the receiving unit through the network, said first push button signal corresponding to a first signal from pushing a button of a front panel of the user device or pushing a first button of a first remote control device associated with the first user device;

a first user terminal of the plurality of user terminals receives or generates a second push button signal and communicates the second push button signal to the receiving unit through the network, said second push button signal corresponding to a second signal from pushing a button of a front panel of the user device or pushing a second button of a second remote control device associated with the second user device;

said receiving unit monitoring the network for the first push button signal and determining a first time since receiving the first push button signal;

said receiving unit monitoring the network for the second push button signal and determining a second time since receiving the second push button signal; and said receiving unit discontinuing distributing the first television channel signal through the network when the first time is greater than a predetermined time and discontinuing distributing the second television channel signal through the network when the second time is greater than the predetermined time.

7. The system as recited in claim 6 wherein the receiving unit receives the television channel signal and encodes the television channel signal into an encoded video signal and communicates the encoded video signal to the plurality of user terminals.

8. The system as recited in claim 7 wherein the encoded video signal comprises an IP encoded signal.

9. The system as recited in claim 6 wherein the plurality of user terminals is disposed within a building.

10. The system as recited in claim 6 wherein the plurality of user terminals is disposed within a vehicle.

* * * * *